US009104813B2

(12) United States Patent
Stanquist et al.

(10) Patent No.: US 9,104,813 B2
(45) Date of Patent: Aug. 11, 2015

(54) SOFTWARE INSTALLATION METHOD, APPARATUS AND PROGRAM PRODUCT

(71) Applicant: International Business Machines Corporation, Armonk, NY (US)

(72) Inventors: Gerald Glen Stanquist, Salt Point, NY (US); Brian Walter Stocker, Port Ewen, NY (US)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 13/716,126

(22) Filed: Dec. 15, 2012

(65) Prior Publication Data
US 2014/0173354 A1   Jun. 19, 2014

(51) Int. Cl.
G06F 11/00   (2006.01)
G06F 11/36   (2006.01)
G06F 9/445   (2006.01)

(52) U.S. Cl.
CPC .............. G06F 11/3688 (2013.01); G06F 8/61 (2013.01)

(58) Field of Classification Search
CPC ..... G06F 11/1004; G06F 11/25; G06F 11/26; G06F 11/36; G06F 11/3664; G06F 11/3672; G06F 11/368; G06F 11/3688; G06F 8/61
USPC ......... 714/38.1, 25, 26, 27, 32, 33, 37, 38.14, 714/39, 46, 47.1; 709/203, 219
See application file for complete search history.

(56) References Cited

U.S. PATENT DOCUMENTS

| | | | |
|---|---|---|---|
| 7,165,189 B1 * | 1/2007 | Lakkapragada et al. ........ | 714/31 |
| 7,260,389 B2 | 8/2007 | Allen et al. | |
| 7,823,126 B2 | 10/2010 | Kim et al. | |
| 8,117,596 B2 | 2/2012 | Thorley et al. | |
| 8,141,038 B2 | 3/2012 | O'Connell et al. | |
| 8,145,673 B2 | 3/2012 | Bloesch et al. | |
| 8,255,362 B2 | 8/2012 | Johnson et al. | |
| 2005/0235281 A1 | 10/2005 | Lefrancois | |
| 2007/0005281 A1 * | 1/2007 | Haggerty ...................... | 702/108 |
| 2007/0106749 A1 | 5/2007 | Melchione et al. | |
| 2008/0201330 A1 | 8/2008 | Bloesch | |
| 2011/0067023 A1 | 3/2011 | Chiyo et al. | |
| 2011/0131001 A1 * | 6/2011 | Mathur et al. .................. | 714/25 |
| 2011/0158103 A1 * | 6/2011 | Hiraide ........................ | 370/241 |
| 2013/0055028 A1 * | 2/2013 | Patil et al. .................... | 714/38.1 |

OTHER PUBLICATIONS

IP.COM et al.; "Software Repository Recommendation System", IPCOM000184812D, Jun. 30, 2009.

Chang et al.; "XML-Based Reusable Component Repository For Embedded Software", 35th IEEE COMPSACW Annual Conference Workshops on, Jul. 18-22, 2011, pp. 345-350.

* cited by examiner

Primary Examiner — Joseph D Manoskey
(74) Attorney, Agent, or Firm — Damion Josephs; Daniel E McConnell

(57) ABSTRACT

A software preload arrangement uses a central server to store the software repository(ries) for various computer instruction files offered for preload into a system being manufactured. To execute the preload, a client workstation is used to execute the actual preload steps for a system under test (SUT). When the SUT needs a given piece of the software release, data is moved down to the client from the server and cached there for delivery to the system under test. In accordance with an important characteristic of this invention, the caching is predictive. That is, data is held in or moved to the client workstation based upon recent activity, so that the time needed to prepare a preload for a system under test is shortened.

18 Claims, 6 Drawing Sheets

| Test Process Definitions | | | | | | Testcases | | | | | | |
|---|---|---|---|---|---|---|---|---|---|---|---|---|
| Process Execution | | | | | | Testcase API Plugins | | | | | | |
| | | | | | | Operation Execution | | | | | | |
| Log Maint Plug-ins | System Info Manager | Profile Manager | Queued Query Manager | Notify Service | Host Access Method Plug-in | Library Access Plug-ins | TFTP NFS NIM BOOTP | Cache Manager | Load Server | Helper Plug-ins | GUI Plug-ins |
| Log Manager | | | | | | Host Comm | Library Access Manager | DHCP SVCS | | | Helper Mgr | GUI Svc |
| Operating System Indpendent Functions | | | | | | | | | | | | |

| Test Process Definitions | | | | Testcases | | | | |
|---|---|---|---|---|---|---|---|---|
| Process Execution | | | | Testcase API Plugins | | | | |
| | | | | Operation Execution | | | | |
| Log Maint Plug-ins | System Info Manager | Profile Manager | Queued Query Manager | Notify Service | Host Access Method Plug-in | Library Access Plug-ins | TFTP NFS NIM BOOTP DHCP SVCS | Cache Manager | Load Server | Helper Plug-ins | GUI Plug-ins |
| Log Manager | | | | | Host Comm | Library Access Manager | | | | Helper Mgr | GUI Svc |
| Operating System Independent Functions | | | | | | | | |

Fig. 2

SOFTWARE INSTALLATION METHOD, APPARATUS AND PROGRAM PRODUCT

FIELD AND BACKGROUND OF INVENTION

This invention relates to the installation of software onto information handling systems, sometimes also herein called computer systems, from repositories of software. While the discussion hereinafter will be focused on installation of operating system (OS) software onto systems being manufactured and assembled before delivery to an end user, the method, apparatus and program product will be appreciated to have broader application.

Information handling systems destined to be high-end servers, in particular, are often delivered to an end user with a software pre-install (preload) that can be one of a number of operating systems (AIX, Linux, i5OS, zOS, etc). In order to keep costs low and maintain a high level of quality, the pre-installation process needs to be cost effective and efficient. As a result, it is desirable that the software pre-install process be executed from a test execution platform that can support the various operating systems types as part of a manufacturing and configuring process. Each OS (operating system) has its own delivery mechanism and install image archive that must be maintained.

SUMMARY OF THE INVENTION

The innovation described here will cache software moving from a common repository to a SUT (System Under Test) independent of the delivery mechanism for a given OS, independent of the manner of packaging the install images for a given OS, and using a common manner of storage and dissemination. An arrangement contemplated as being used for software preload uses a central server to store the software repository(ries) for various operating systems (OS) (for example) that are offered for preload. To execute the preload, a client workstation (such as a notebook computer system) is used to execute the actual preload steps (and can be the same client that was used to test the SUT). When the SUT needs a given piece of the software release, data is moved down to the client from the server and cached there for delivery to the system under test. In accordance with an important characteristic of this invention, the caching is predictive. That is, data is held in or moved to the client workstation based upon recent activity, so that the time needed to prepare a preload for a system under test is shortened.

BRIEF DESCRIPTION OF DRAWINGS

Some of the purposes of the invention having been stated, others will appear as the description proceeds, when taken in connection with the accompanying drawings, in which:

FIG. 2 is an illustration of the software stack involved in implementation of this invention;

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
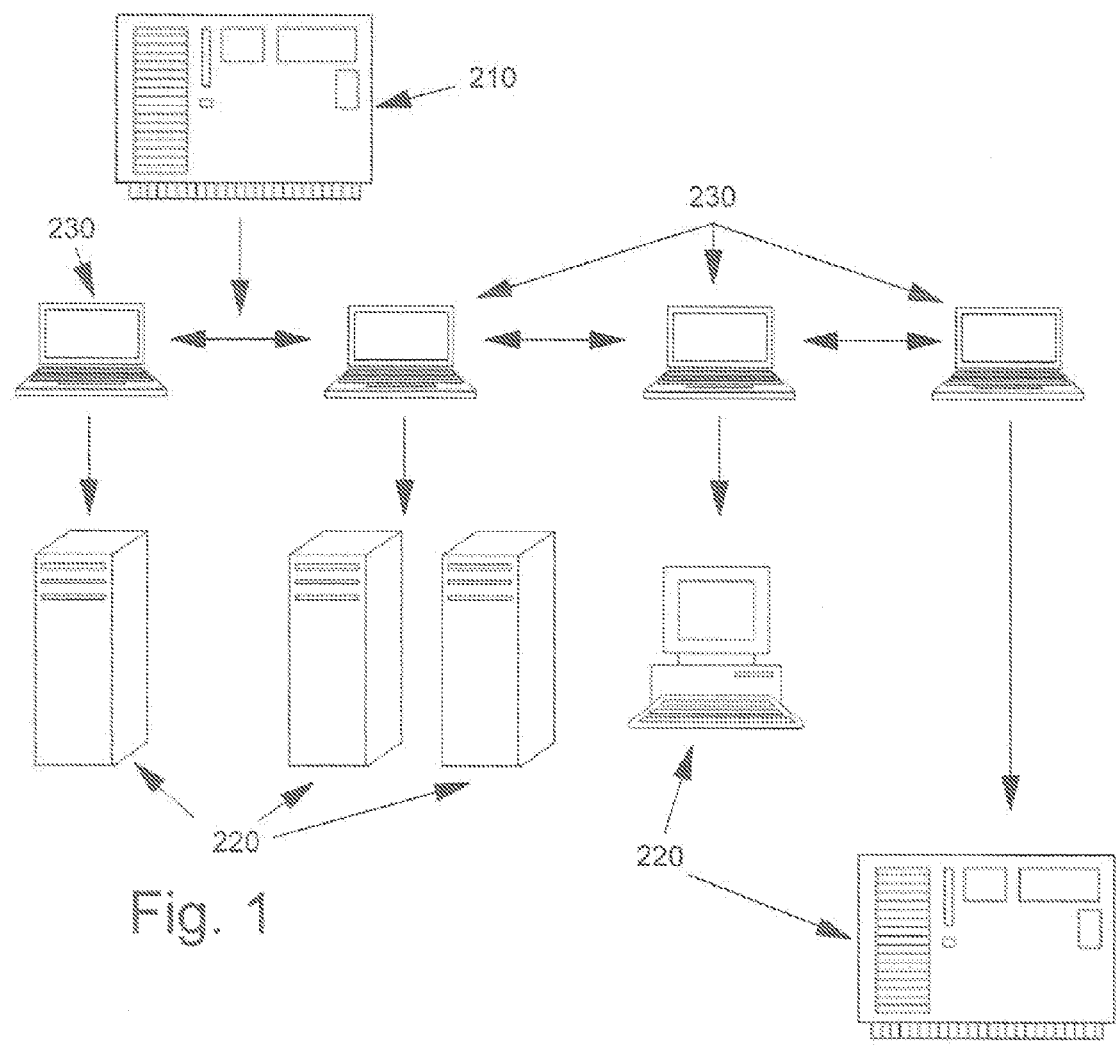
FIG. 1 is a schematic representation of information handling systems among which the present invention is implemented.

Referring now to FIG. 1, an environment in which the present invention is exercised is there shown. An upstream server system 210 functions as a repository of software to ultimately be pre-installed or preloaded into target end user systems 220 through the intervening client workstations 230. As illustrated, the end user systems 220 may be systems of varying types undergoing manufacture, test and configuration while the client workstations may be notebook systems. While this environment is used to illustrate the description which follows, the reader will understand that varying types of computer systems may be used in implementing the processes, hardware and executable programs here described. The reader should be careful of the arrows extending from reference characters 210, 220 and 230 to identify systems and the other arrows indicating data flows as will be described more fully hereinafter.

Figure 3:
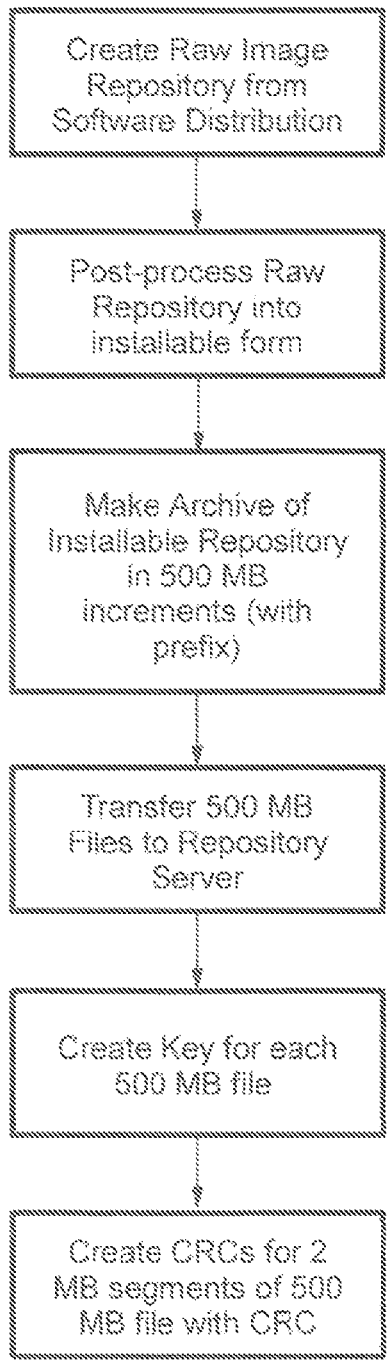
FIGS. 3, 4 and 5 are flow charts illustrating steps in the implementation of this invention.
Figure 4:
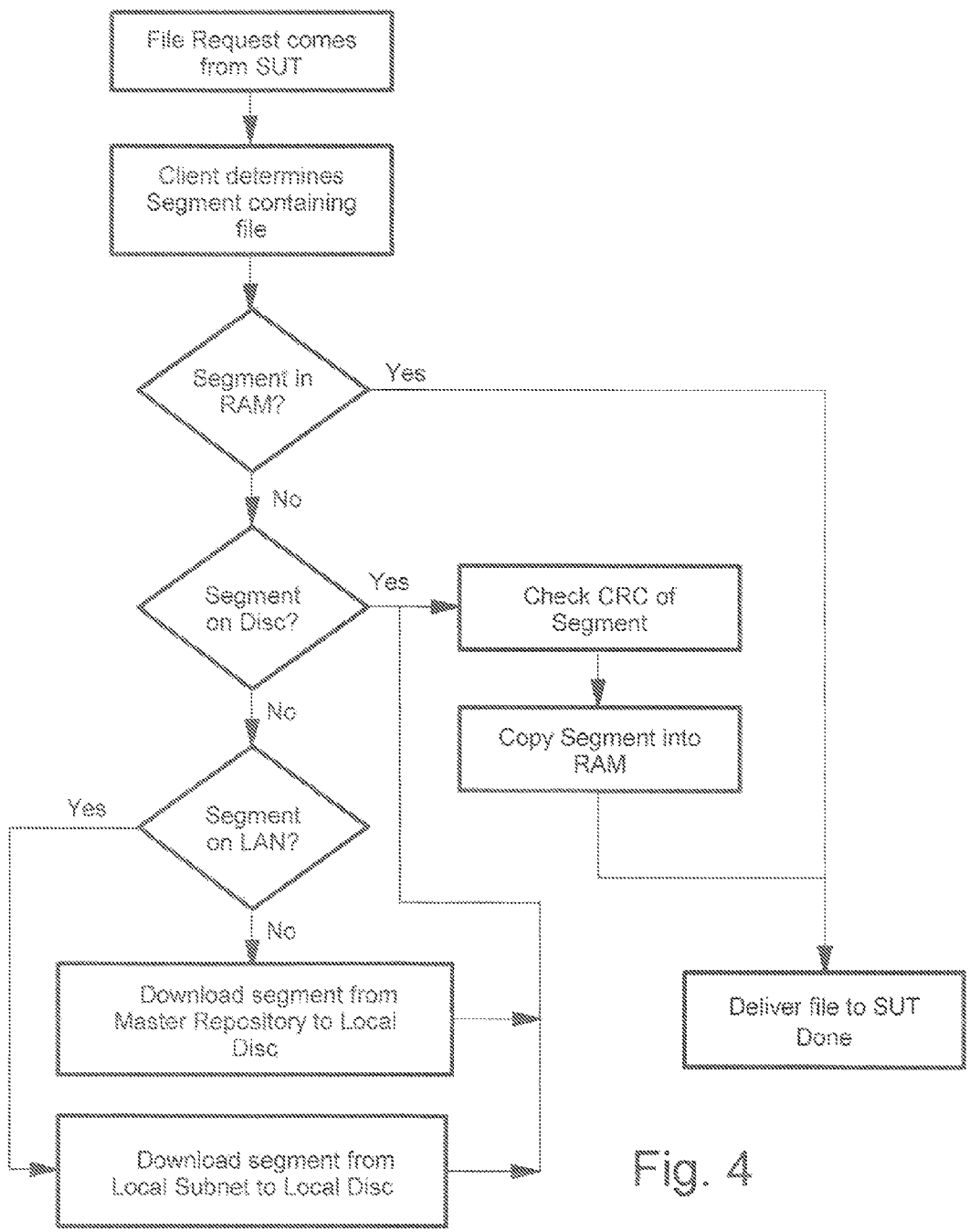
Figure 5:
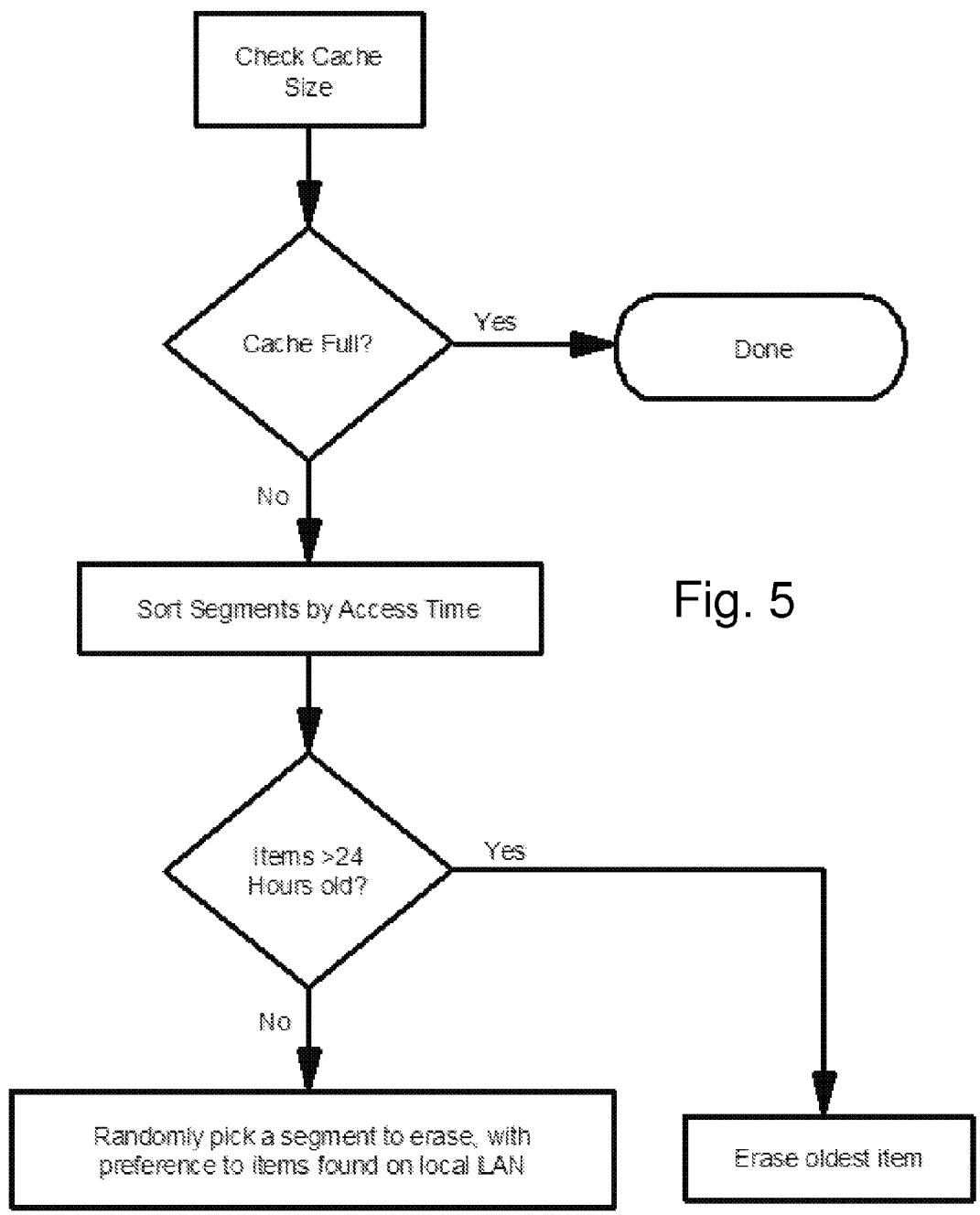

The software stored on and residing in the server 210 as a repository is made available to be stored on the other systems in accordance with what will be described with reference to FIG. 2 through 5. FIG. 2 illustrates a software stack which, when executing, communicates with a system 220 under test, manages communication protocols, and manages a software cache repository. FIG. 3 illustrates the creation of a software repository, here contemplated as related to operating systems to be available for pre-installation on a system under test 220, to be managed by the software represented in FIG. 2. FIG. 4 addresses the management of the software cache from which a file is to be delivered. FIG. 5 addresses the management of an addition to a software cache from which software is transferred to a system under test 220.

A cache manager is used to reduce server load and speed up transfer of large (>1 MB) files. When a file to be used with cache manager is placed on the repository server (FIG. 3), a program executes which creates a unique 11 character key for the file, independent of the file name. The file is parsed or divided into 512 byte sectors, then grouped into 4096 sectors to make 2 MB segments. A 32 bit cyclic redundancy check (CRC) value for is determined for each segment. A control file is created containing the key, some additional header information, and the CRC value for each segment. Once created, both the original and control files may be transferred to repository servers and/or client workstations at other sites if manufacture, test and pre-install are to be performed at scattered sites, with no additional processing required at such local sites.

Following a file request from a system under test 220, a client system 230 (e.g. preload server) determines the data segment containing the file, then opens the file, using the name that the file has on the server 210 (FIG. 4). The server returns the key for the file and the list of CRC values for the segments. The cache manager client reads the file by requesting data starting with a given sector number. The cache manager determines which segment the requested sector is in, then checks to see if that segment is already cached in RAM in the client system. If it is, the data is delivered to the system under test. If the data is not in RAM, the cache manager checks to see if it already has the required segment on disk. If the segment is on disk, it is read into storage and the CRC is checked with the values loaded from the server. If the CRC is correct, the data is delivered to the system under test.

If the segment is not available locally, a broadcast message is sent to nearby client systems containing the key for the file and the requested segment. If a client system responds that it has the requested data, the segment is read from that location, and the CRC is checked. If the CRC is good, the segment is delivered to the system under test. If the CRC is not good, the data is not used, and the manager waits for a response from the repository server.

If no nearby client system responds with data that is usable within a fixed period of time (such as one second), the requested segment is read directly from the repository server 210. The CRC is checked, and if good the segment is delivered. If the CRC is bad, the read from server will be retried up to two times. If the retries also fail an error is returned to the client system.

When a new segment is loaded, the cache is checked for available space. Available space is determined by both number of bytes in the cache, and available space on the cache file system. Both are configurable. If no space is available, space is made in the cache (FIG. 5) and the segment is added to the cache. Caching is done by key and segment number. The process of maintaining the cache enters into the predictive characteristic of the process described. The cache manager will sort the access times of all segments of all files in the cache. If the oldest segment is more than 24 hours old or there are less than 10 segments cached, caching is stopped. Then the manager deletes approximately 10% of the cache (oldest first) or until a file is encountered that is less than 24 hours old. If the oldest segment is less than 24 hours old or if there are fewer than 50 segments cached, caching is stopped. Then the manager randomly deletes approximately 2% of the cache.

An advantage of this cache management process is that it is entirely automatic—there need be no human involvement once file is placed on site server. Data integrity is guaranteed because of CRC checking of segments each time they are used. Damaged caches are automatically fixed. The use of a unique key ensures that replacing a file on site server automatically invalidates cache on all client systems. Local caches in client systems will only contain portions of the file that were actually requested by the client. There is no need for all data requested by client to reside in the cache at any one time (although in practice it is best if it does, and it usually does). Use of local caching, and ability to fetch segments from client system's cache greatly reduces load on the repository server (once data has been cached, site server only needs to be accessed for key and CRC info, approx 0.0002% of the file size). Random discards of recent cache data increases the chance that another client system will have the requested data, even if the data is too large to be cached on one client system.

Yet another advantage, and a characteristic of this invention, is that the cache functions as a predictive cache. That is, data which has been recently requested for preload into a system under test is readily available in the event that the next system to be processed will require the same preload. In an active manufacturing environment, there is a substantial probability that successive systems under test will in fact request the same preload.

The data to be preloaded onto a system under test is contained in the file system in multiple volumes, each approximately 500 MB in size. Use of volumes and their size facilitates distribution requirements. A failure when transferring to a remote site (or damage at any site) only requires resending individual volumes, which can fit on a CD and be distributed that way if required. Each volume is one file on the repository server and is seen as one file by the cache manager.

Figure 6:
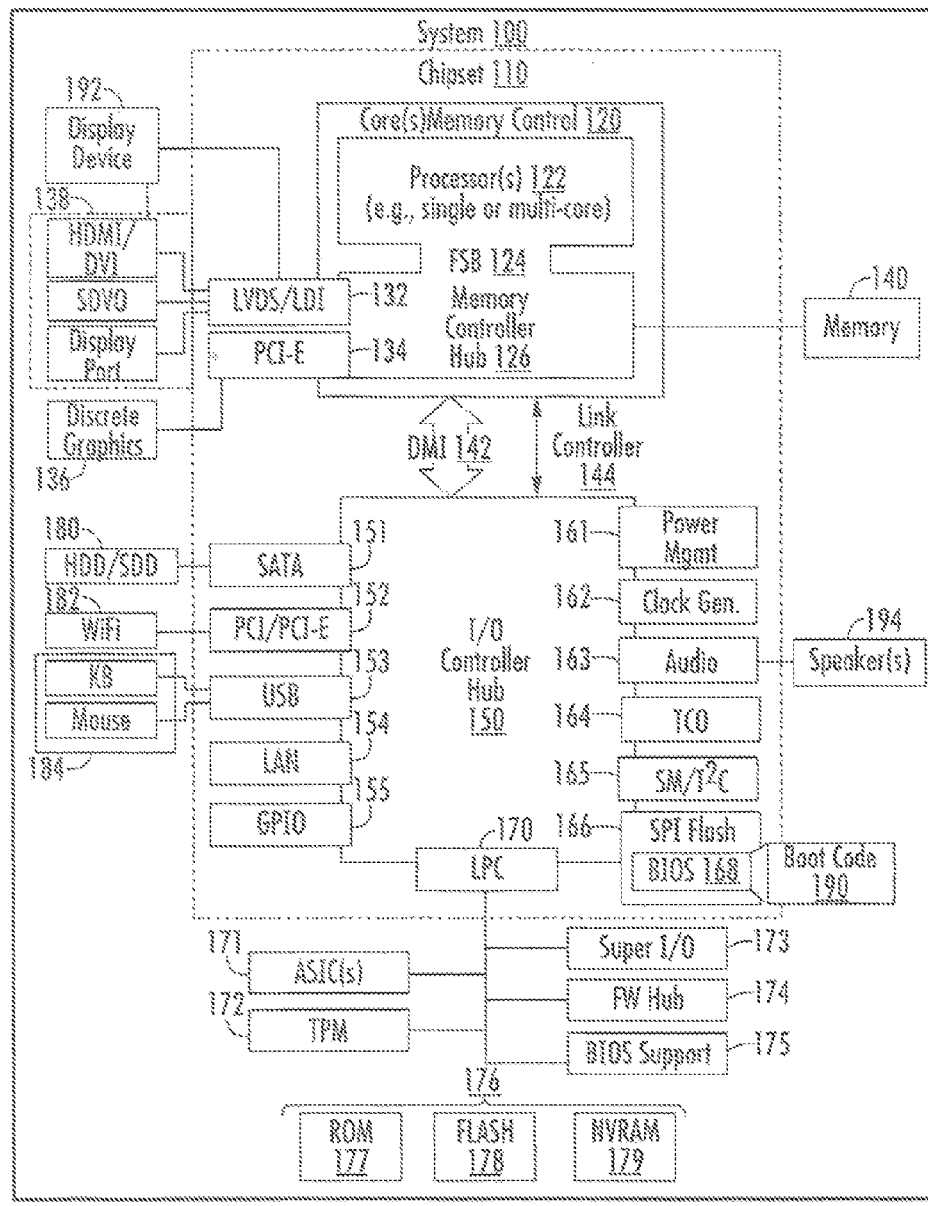
FIG. 6 is a representation of the elements of an information handling system such as those of FIG. 1.

Turning now to FIG. 6, the term "circuit" or "circuitry" may be used herein in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

While various exemplary circuits or circuitry are discussed, FIG. 6 depicts a block diagram of an illustrative exemplary computer system 100. The system 100 may be a desktop computer system or a workstation computer; however, as apparent from the description herein, a client device, a server or other machine may include other features or only some of the features of the system 100. The system 100 may function in the arrangements of FIG. 1 as any or all or the systems 210, 220 and 230.

The system 100 of FIG. 6 includes a so-called chipset 110 (a group of integrated circuits, or chips, that work together, chipsets) with an architecture that may vary depending on manufacturer (e.g., INTEL®, AMD®, etc.). The architecture of the chipset 110 includes a core and memory control group 120 and an I/O controller hub 150 that exchange information (e.g., data, signals, commands, etc.) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (e.g., single or multi-core) and a memory controller hub 126 that exchange information via a front side bus (FSB) 124; noting that components of the group 120 may be integrated in a chip that supplants the conventional "northbridge" style architecture.

In FIG. 6, the memory controller hub 126 interfaces with working memory 140 (e.g., to provide support for a type of RAM that may be referred to as "system or working memory"). The memory controller hub 126 further includes a LVDS interface 132 for a display device 192 (e.g., a CRT, a flat panel, a projector, etc.). A block 138 includes some technologies that may be supported via the LVDS interface 132 (e.g., serial digital video, HDMI/DVI, display port). The memory controller hub 126 also includes a PCI-express interface (PCI-E) 134 that may support discrete graphics 136. In FIG. 1, the I/O hub controller 150 includes a SATA interface 151 (e.g., for longer term, non-transitory memory such as HDS, SDS, etc.), a PCI-E interface 152 (e.g., for wireless connections 182), a USB interface 153 (e.g., for input devices 184 such as keyboard, mice, cameras, phones, storage, etc.), a network interface 154 (e.g., LAN), a GPI interface 155, a LPC interface 170 (for ASDICS 171, a T.M. 172, a super I/O 173, a firmware hub 174, BIOS support 175 as well as various types of memory 176 such as ROM 177, Flash 178, and VRAM 179), a power management interface 161, a clock generator interface 162, an audio interface 163 (e.g., for speakers 194), a TO interface 164, a system management bus interface 165, and SC. Flash 166, which can include BIOS 168 and boot code 190. The I/O hub controller 150 may include gigabit Ethernet support.

The system 100, upon power on, may be configured to execute boot code 190 for the BIOS 168, as stored within the SCI. Flash 166, and thereafter processes data under the control of one or more operating systems and application software (e.g., stored in system memory 140). An operating system may be stored in any of a variety of locations and accessed, for example, according to instructions of the BIOS 168. As described herein, a device may include fewer or more features than shown in the system 100 of FIG. 6.

Figure 7:
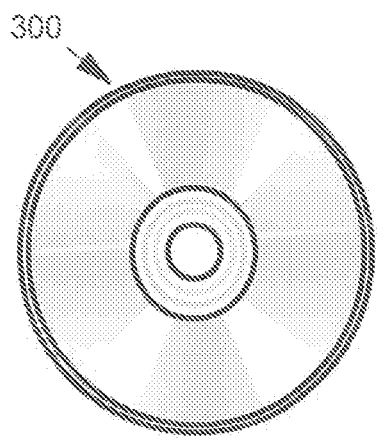
FIG. 7 is an illustration of a non-transitory computer readable medium (here an optical disc) on which computer executable instructions are placed in the program product form of this invention.

One or more aspects of the present invention can be included in an article of manufacture (e.g., one or more computer program products) having, for instance, non-transitory, tangible computer readable media, indicated at 300 in FIG. 7. The media has embodied therein, for instance, computer readable program code for providing and facilitating the capabilities of the present invention. The article of manufacture can be included as a part of a computer system or sold separately. Machine readable storage mediums may include fixed hard drives such as those mentioned above, optical discs such as the disc 300, magnetic tapes, semiconductor memories such as read only memories (ROMs), programmable memories (proms of various types), flash memory, etc. The article containing this computer readable code is utilized by executing the code directly from the storage device, or by copying the code from one storage device to another storage device, or by transmitting the code on a network for remote execution.

In the drawings and specifications there has been set forth a preferred embodiment of the invention and, although specific terms are used, the description thus given uses terminology in a generic and descriptive sense only and not for purposes of limitation.

What is claimed is:

1. A method comprising:
parsing a computer instruction file to be installed on a system under test into segments of selected size and storing the segments accessibly to a computer network having a repository server computer system and a plurality of client workstation computer systems;
determining by interaction between a client workstation and a connected system under test computer system whether the parsed computer instruction file is to be installed on the system under test;
responding to a determination that the parsed computer instructions are to be installed on the system under test by delivering the segments through the client workstation to the system under test; and
maintaining in the client workstation a cache of segments predictive of the segments to be delivered to a next successive system under test connected to the client workstation.

2. A method according to claim 1 where in the parsing comprises computing a cyclic redundancy check (CRC) value for each parsed segment and storing that value with the segment.

3. A method according to claim 1 further comprising determining at the client workstation whether a segment to be delivered is available to the workstation from a location which is one of the client workstation working memory, the client workstation non-transitory memory, another network connected client workstation, and the repository server.

4. A method according to claim 3 wherein a segment available from client workstation working memory is delivered directly to the system under test.

5. A method according to claim 3 wherein a segment available from one of the client workstation non-transitory memory, another network connected client workstation, and the repository server is checked for a correct CRC value and, if the CRC is determined to be correct, delivered to the system under test and processed for caching in client workstation working memory.

6. A method according to claim 1 wherein the maintaining of a cache of segments comprises determining at the client workstation whether a segment to be delivered is to be processed for caching in client workstation working memory, determining whether a cache maintained at the client workstation is full and, if determined that the cache is less than full, sorting cached segments by their respective time last accessed, determining whether any cached segment has been held in cache for more than a predetermined time interval and, if so, erasing a longest held segment from cache, or, if no such segment is found, randomly selecting a segment to be erased from cache.

7. An apparatus comprising:
a computer network having a repository server computer system, a plurality of client workstation computer systems, and a system under test computer system, each computer system having a processor and associated working and non-transitory memory;
computer instructions executing on the processors of said computer systems and effective when executing to:
parse a computer instruction file to be installed on said system under test into segments of selected size and storing the segments accessibly to said computer network;
determine by interaction between said client workstation and said system under test computer system whether the parsed computer instruction file is to be installed on said system under test;
respond to a determination that the parsed computer instructions are to be installed on said system under test by delivering the segments through said client workstation to said system under test;
maintain in said memory of said client workstation a cache of segments predictive of the segments to be delivered to a next successive system under test connected to said client workstation.

8. An apparatus according to claim 7 wherein said computer instructions are effective when executing on the processors of said computer systems to compute a cyclic redundancy check (CRC) value for each parsed segment and store that value with the segment.

9. An apparatus according to claim 7 wherein said computer instructions are effective when executing to determine at said client workstation whether a segment to be delivered is available to said client workstation from a location which is one of said client workstation working memory, said client workstation non-transitory memory, another network connected client workstation, and said repository server.

10. An apparatus according to claim 9 wherein a segment available from client workstation working memory is delivered directly to the system under test.

11. An apparatus according to claim 9 wherein a segment available from one of the client workstation non-transitory memory, another network connected client workstation, and the repository server is checked for a correct CRC value and, if the CRC is determined to be correct, delivered to the system under test and processed for caching in client workstation working memory.

12. An apparatus according to claim 7 wherein said computer instructions are effective when executing on the processors of said computer systems to maintain a cache of segments by determining at said client workstation whether a segment to be delivered is to be processed for caching in said client workstation working memory, determining whether a cache maintained at the client workstation is full and, if determined that the cache is less than full, sorting cached segments by their respective time last accessed, determining whether any cached segment has been held in cache for more than a predetermined time interval and, if so, erasing a longest held segment from cache, or, if no such segment is found, randomly selecting a segment to be erased from cache.

13. A program product for facilitating the installation of computer instructions on a computer system under test, the computer program product comprising:
- a non-transitory computer readable storage medium having computer readable program code embodied therewith, the computer readable program code being effective—when executing on a computer network which has a repository server computer system, a plurality of client workstation computer systems, and a system under test computer system, each computer system having a processor and associated working and non-transitory memory—to:
- parse a computer instruction file to be installed on said system under test into segments of selected size and store the segments accessibly to said computer network;
- determine by interaction between said client workstation computer system and said system under test computer system whether the parsed computer instruction file is to be installed on said system under test;
- respond to a determination that the parsed computer instructions are to be installed on said system under test by delivering the segments through said client workstation to said system under test;
- maintain in said memory of said client workstation a cache of segments predictive of the segments to be delivered to a next successive system under test connected to said client workstation.

14. A program product according to claim 13 wherein said computer instructions are effective when executing on the processors of said computer systems to compute a cyclic redundancy check (CRC) value for each parsed segment and store that value with the segment.

15. A program product according to claim 13 wherein said computer instructions are effective when executing to determine at said client workstation whether a segment to be delivered is available to said client workstation from a location which is one of said client workstation working memory, said client workstation non-transitory memory, another network connected client workstation, and said repository server.

16. A program product according to claim 15 wherein a segment available from client workstation working memory is delivered directly to the system under test.

17. A program product according to claim 15 wherein a segment available from one of the client workstation non-transitory memory, another network connected client workstation, and the repository server is checked for a correct CRC value and, if the CRC is determined to be correct, delivered to the system under test and processed for caching in client workstation working memory.

18. A program product according to claim 13 wherein said computer instructions are effective when executing on the processors of said computer systems to maintain a cache of segments by determining at said client workstation whether a segment to be delivered is to be processed for caching in said client workstation working memory, determining whether a cache maintained at the client workstation is full and, if determined that the cache is less than full, sorting cached segments by their respective time last accessed, determining whether any cached segment has been held in cache for more than a predetermined time interval and, if so, erasing a longest held segment from cache, or, if no such segment is found, randomly selecting a segment to be erased from cache.

* * * * *